(12) United States Patent
McAuliffe et al.

(10) Patent No.: US 8,216,329 B2
(45) Date of Patent: Jul. 10, 2012

(54) REMOVABLE EXTERNAL FILTER FOR SERVO AIR ACTUATED VALVES

(75) Inventors: Christopher McAuliffe, Windsor, CT (US); Donald E. Army, Jr., Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 143 days.

(21) Appl. No.: 12/843,232

(22) Filed: Jul. 26, 2010

(65) Prior Publication Data
US 2012/0017552 A1  Jan. 26, 2012

(51) Int. Cl.
*B01D 46/00* (2006.01)
*F16K 31/12* (2006.01)

(52) U.S. Cl. .................. 55/385.1; 55/418; 251/30.01

(58) Field of Classification Search .............. 55/385.1, 55/418, 498; 251/25, 30.01, 30.02, 30.03, 251/30.04, 30.05
See application file for complete search history.

(56) References Cited

U.S. PATENT DOCUMENTS

| | | | |
|---|---|---|---|
| 3,918,835 A | 11/1975 | Yamarik et al. | |
| 4,105,561 A | 8/1978 | Domnick | |
| 4,430,867 A | 2/1984 | Warner | |
| 4,477,051 A * | 10/1984 | Ben-Yehuda | 251/30.01 |
| 4,679,764 A * | 7/1987 | Smith et al. | 251/14 |
| 4,769,051 A | 9/1988 | Defrancesco | |
| 5,020,771 A * | 6/1991 | Nakatsukasa et al. | 251/30.02 |
| 5,213,303 A * | 5/1993 | Walker | 251/30.02 |
| 5,323,624 A | 6/1994 | Schwalm | |
| 5,431,706 A | 7/1995 | Paas | |
| 6,511,598 B2 | 1/2003 | Gershenson | |
| 6,726,456 B2 | 4/2004 | Hayashi et al. | |
| 6,877,714 B2 * | 4/2005 | Hall | 251/45 |
| 7,708,792 B2 | 5/2010 | Kowalski | |
| 2007/0022721 A1 | 2/2007 | Goupil, Jr. | |

* cited by examiner

*Primary Examiner* — Robert Clemente
(74) *Attorney, Agent, or Firm* — Carlson, Gaskey & Olds, P.C.

(57) ABSTRACT

An example filter assembly prevents particles from entering a control valve and defines an airflow path between an inlet and outlet. An inlet tube extends from an inlet and defines an inlet passage into a filter housing. Openings within the inlet tube open into an interior space of a filter housing. An outer housing defines a cavity within which the filter housing is secured. The filter housing includes an open top portion that engages a cap that covers and seals the outer housing. The cap holds the filter housing to prevent movement of the filter housing.

8 Claims, 2 Drawing Sheets

REMOVABLE EXTERNAL FILTER FOR SERVO AIR ACTUATED VALVES

BACKGROUND

This disclosure generally relates to a filter element for preventing contaminant intrusion into working parts. More particularly, this disclosure relates to a filter element to block particles in a controlled airflow from reaching an actuator.

Airflow is utilized and controlled for many reasons and by many different methods and actuators. In most applications it is required to prevent particles and other foreign matter from entering the actuator. In many instances the actuator operates a shaft that in turn moves a control disc or flap that is positioned within the airflow. Filters utilized to prevent contaminant intrusion are selected to prevent specific sized particles from entering the critical parts of the actuators. The filter can become clogged quickly if opening sizes are excessively small and therefore require frequent changes. However, a filter with large openings may not capture sufficient particles to provide the desired protection of the actuator. Moreover, a clogged filter can affect operation of the control valve and restrict airflow.

SUMMARY

A disclosed filter assembly prevents particles from entering a control valve and defines an airflow path between an inlet and outlet. The example filter assembly includes an inlet tube that extends from an inlet and defines an inlet passage into a filter housing. Openings within the inlet tube open into an interior space of the filter housing. An outer housing defines a cavity within which the filter housing is secured. The filter housing includes an open top portion that engages a cap that covers and seals the outer housing to hold the filter housing and prevent movement of the filter housing.

The example filter assembly filters particulates from the airflow communicated to the control valve and also defines the airflow passage between the inlet and the outlet. During filter replacement particulate matter is prevented from falling into the inlet passageway by the inlet tube extending from the inlet opening. Accordingly, the filter housing can be removed and replaced without particles falling into the inlet.

These and other features disclosed herein can be best understood from the following specification and drawings, the following of which is a brief description.

DETAILED DESCRIPTION

Figure 1:
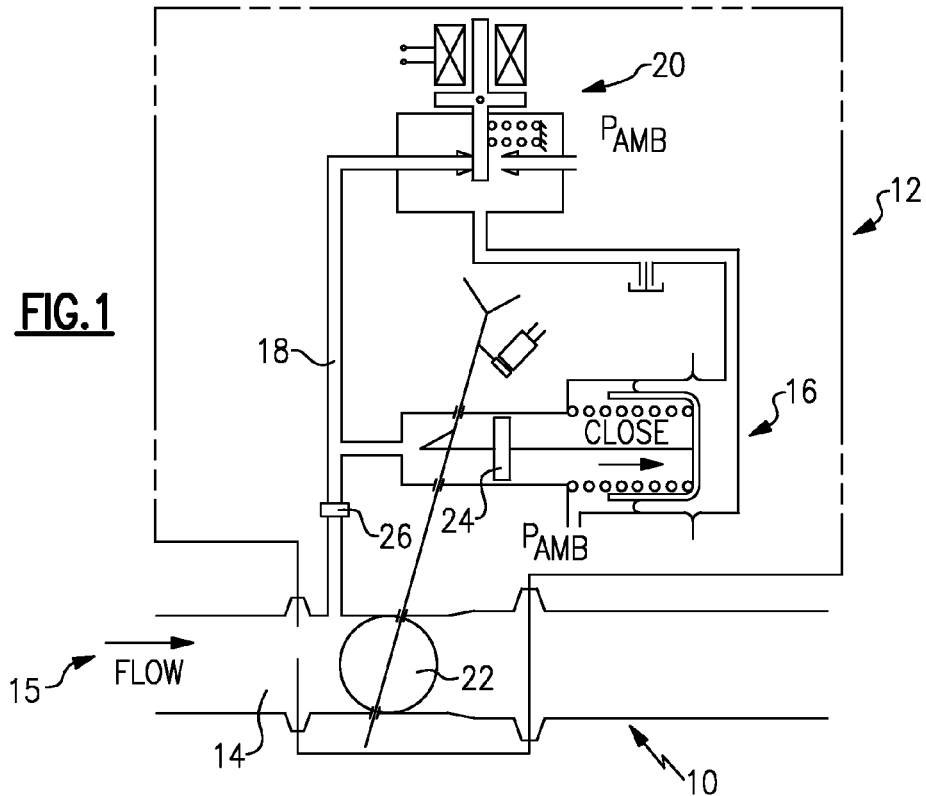
FIG. 1 is a schematic of an example pneumatically driven air control valve.
Figure 2:
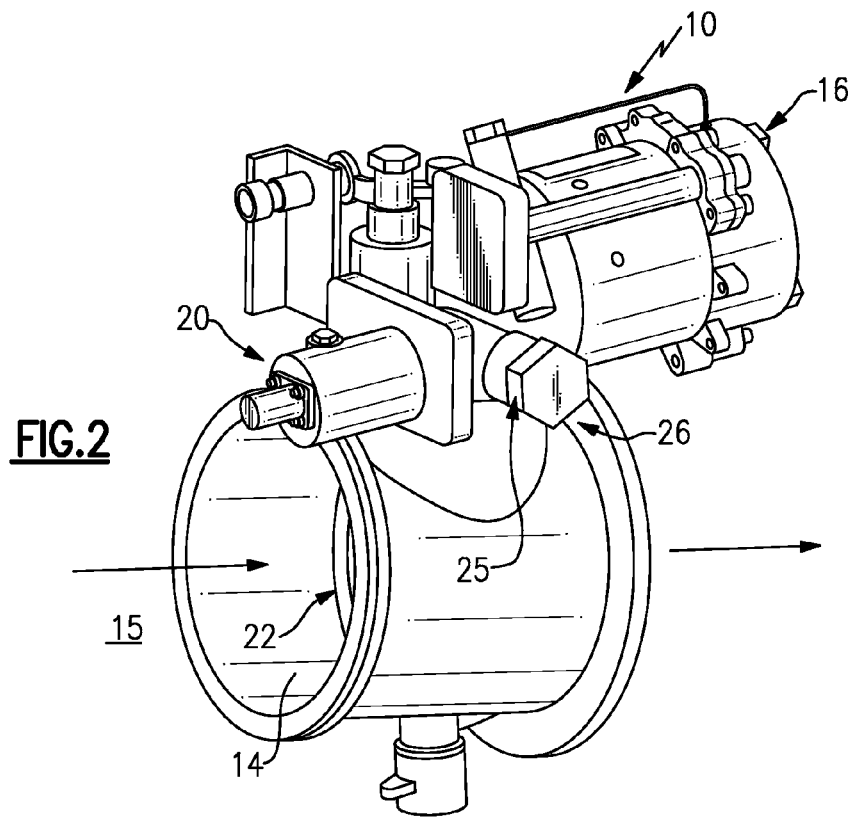
FIG. 2 is a perspective view of the example pneumatically driven air control valve.

Referring to FIGS. 1 and 2, a portion of an example pneumatically driven air control valve is schematically shown at 10 and includes a control valve assembly 12 for controlling airflow through a main passage 14. The control valve assembly 12 includes an actuator 16 that utilizes a portion of air tapped from the main airflow 15 through the main passage 14. A control passage 18 directs air to a torque motor 20 to modulate a piston 24 that in turn controls a position of a valve plate 22. The valve plate 22 is disposed within the main passage 14 to control the main airflow 15. The example torque motor 20 controls a pressure differential across the piston 24 that is mechanically linked to move the valve plate 22 between an open and closed position that produces a desired airflow through the main passage 14. It should be understood, that although an example control valve configuration is disclosed by way of example, other valve configurations would also benefit from this disclosure.

A filter assembly 26 is disposed within the control passage 18 to block particles and other contaminants from reaching the torque motor 20 and piston 24. As appreciated, particles and other contaminants present within the airflow 15 can build up within the torque motor 20 and hamper desired operation. Accordingly, the filter assembly 26 blocks such particles and contaminants from reaching the torque motor 20.

The example filter assembly 26 is mounted through an external port 25 of the control valve assembly 12. The filter assembly 26 can therefore be accessed and removed periodically for maintenance.

Figure 3:
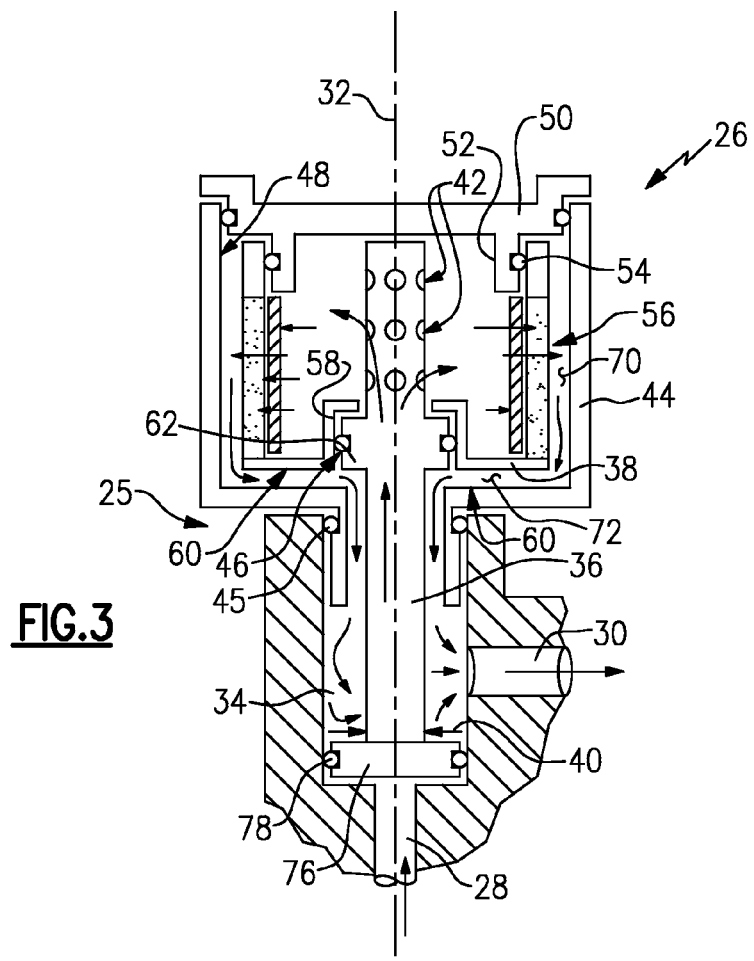
FIG. 3 is a cross-sectional view of an example external filter mounted within an example control passage.

Referring to FIG. 3, the example filter assembly 26 is disposed within the control passage 18 and defines an airflow passage between an inlet 28 and an outlet 30. The example inlet 28 is disposed about an axis 32 and the outlet 30 is transverse to the inlet 28. The inlet 28 and outlet 30 open into a chamber 34 that receives the filter assembly 26. The chamber 34 includes a diameter greater than the inlet 28 into which the filter assembly 26 is received. As appreciated, although the example chamber 34 is cylindrical, the chamber 34 could be any shape to receive the filter assembly 26.

An inlet tube 36 extends from the inlet 28 into the chamber 34 and defines an inlet passage into a filter housing 38. The inlet tube 36 is disposed along the axis 32 common to the inlet 28. The inlet tube 36 includes an outer diameter 40 that is smaller than the chamber 34 such that a space is defined between the inlet tube 36 and the chamber 34. The inlet tube 36 includes openings 42 that open within the filter housing 38, but not within the chamber 34. Therefore, airflow from the inlet 28 is directed into the filter housing 38 and not into the space defined between the inlet tube 36 and the chamber 34.

An outer housing 44 is mounted to the chamber 34 and extends from the chamber 34 to define a cavity within which the filter housing 38 is secured. A seal 45 seals the interface between the outer housing 44 and an inner surface of the chamber 34. The filter housing 38 includes an open top portion 48 that engages a cap 50 that covers and seals the outer housing 44. The cap 50 includes an internal lip 52 that holds the filter housing 38 in a desired orientation within the outer housing 44. A first seal 54 is supported on the lip 52 and seals against an inner surface of the filter housing 38. The example internal lip 52 is concentric about the axis 32 and matches the inner diameter of the filter housing 38. The example desired orientation of the filter housing 38 is spaced apart from an inner surface of the outer housing 44 to define an annular chamber 70.

A bottom portion 60 of the filter housing 38 includes a recess 58 that receives a shoulder 62 of the inlet tube 36. The shoulder 62 includes a seal 46 that seals against an inner surface of the recess 58. Moreover, the shoulder 62 holds the bottom portion 60 of the filter housing 38 spaced apart from an inner bottom surface of the outer housing 44. The spaced apart orientation of the filter housing 38 relative to the outer housing 44 provides an airflow passage 72 that communicates outgoing airflow from the filter housing 38 to the chamber 34.

The filter housing 38 includes a filter medium 56 through which air from the inlet tube 36 flows. The filter medium 56 comprises at least one filter having a plurality of openings of a desired size and density. The number of openings and density provide a desired porosity to filter, or block the flow of particles of a set size from flowing through the filter medium 56. Moreover, the filter medium 56 is selected to balance any restriction to airflow with the removal of particulate matter from that airflow. In other words, the filter medium is selected such that any restriction to airflow is within desired operating parameters.

The example filter medium 56 comprises a wire mesh fabric that is supported on the filter housing 38. The filter housing 38 supports the wire mesh fabric about the outer circumference. The wire mesh fabric provides a desired air flow area along with a minimum opening size to block the flow of particles of a defined size. As appreciated, other materials for forming the filter medium 56 are within the contemplation of this disclosure.

Figure 4:
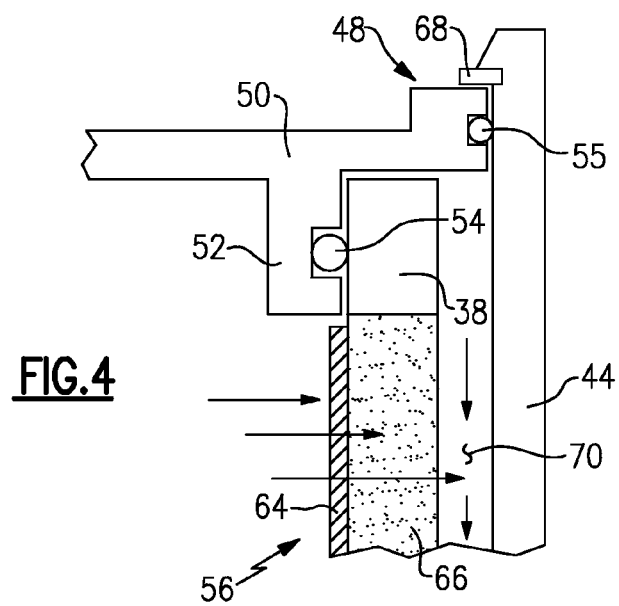
FIG. 4 is an enlarged cross-sectional view of an example cap configuration of the example external filter.

Referring to FIG. 4 with continued reference to FIG. 3, the example filter medium 56 includes a first filter 64 that has a first porosity and a second filter 66 that has a second porosity different than the first porosity. In the disclosed example, the first filter 64 comprises porosity larger or courser than that of the second filter 66 such that the first filter 64 will catch larger particles while the second filter 66 will catch smaller particles not blocked by the first filter 64. The first filter 64 is disposed on an inner most radial surface of the filter housing 38 such that airflow will first flow through the first filter 64. The second filter 66 includes smaller openings and therefore will retain particles much smaller than those initially caught by the first filter 64. The second filter is 66 is disposed about the first filter 64 and on an outermost surface of the filter medium 56. It should be understood that the filter medium 56 can also include one filter with a single porosity, or several filter layers as desired.

The cap 50 includes the first seal 54 that seals against an inner surface of the filter housing 38 and a second seal 55 that seals the cap 50 against an inner surface of the outer housing 44. A securing member 68 holds the cap 50 against the top portion of the filter housing 38. Moreover, the cap 50 holds the filter housing 38 against the shoulder 62 of the inlet tube 36 (FIG. 3) to prevent movement of the filter housing 38 relative to the outer housing 44.

The example filter assembly 26 filters particulates from the airflow communicated to the control valve assembly 12. The example filter assembly 26 also defines the airflow passage between the inlet 28 and the outlet 30. The airflow passage begins with airflow flowing through the inlet 28 into the inlet tube 36. Air within the inlet tube 36 exits through openings 42 of the inlet tube 36 into an interior space of the filter housing 38. Airflow then passes through the first course filter 64 and the second finer filter 66 into the chamber 70 disposed about the filter housing 38. The chamber 70 is annular and concentric about the axis 32 and the filter housing 38.

Airflow from the chamber 70 flows under the filter housing 38 into the passage 72 between the bottom portion 60 of the air filter housing 38 and the outer housing 44. The space between the filter housing 38 and the outer housing 44 provides the path for communicating air into the chamber 34 defined about the inlet tube 36. The chamber 34 is annular and concentric about the inlet tube 36 and communicates airflow with the outlet 30. Air through the outlet 30 is then flowed to the torque motor 20 (Best shown in FIGS. 1 and 2). Accordingly, not only does the example filter assembly 26 block particulate flow, but it also defines the flow passage between the inlet 28 and the outlet 30.

The inlet tube 36 includes a bottom shoulder 76 that fits over the opening to the inlet 28. The shoulder 76 includes a seal 78 that separates incoming airflow from outgoing airflow. During filter replacement, particulate matter that may fall from the filter housing 38 toward the inlet 28. None of these particles can fall into the inlet 28 because the inlet tube 36 includes no openings near the inlet 28. Accordingly, the filter housing 38 can be removed and replaced without particles falling into the inlet 28.

The disclosed example filter assembly 26 provides a removable air filter to block particles from entering the control valve assembly 12, while also protecting against contaminant intrusion into the control passage 18 during replacement of the filter medium. The example filter assembly 26 also defines the passage between the inlet 28 and outlet 30. Moreover, the example filter housing 38 is positively held in place such that a build up of particle matter does not create airflow leaks around the filter medium 56.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. An air control valve comprising:
   a valve plate for controlling airflow through a main passage;
   a control passage for supplying control air to the control valve, the control passage including an inlet and an outlet transverse to the inlet;
   an outer housing supported at least partially within the control passage;
   an inlet tube extending from the inlet into the outer housing;
   a filter housing supported within the outer housing and sealed against an outer surface of the inlet tube, the filter housing including a filter medium for trapping contaminants within the filter housing; and
   an outlet passage defined between the filter housing and the outer housing and the inlet tube and the control passage with the outlet passage being in communication with the outlet within the control passage.

2. The air control valve as recited in claim 1, wherein the inlet tube is disposed along an axis common with the inlet of the control passage and includes a seal for preventing contaminants from entering the inlet.

3. The air control valve as recited in claim 2, including a cap attached to an end of the outer housing that engages the filter housing to maintain a desired relative position of the filter housing within the outer housing.

4. The air control valve as recited in claim 3, wherein the inlet tube includes a shoulder for holding the filter housing spaced apart from the outer housing.

5. The air control valve as recited in claim 4, wherein the filter housing is disposed about the inlet tube and spaced apart from an inner surface of the outer housing to define an annular passage in communication with the outlet.

6. The air control valve as recited in claim 2, wherein the inlet tube includes openings disposed within the filter housing and defines an inlet passage from the inlet into the filter medium.

7. The air control valve as recited in claim 5, wherein a portion of an outlet passage is defined about the inlet tube disposed within the control passage.

8. The air control valve as recited in claim 2, wherein the filter element comprises a first filter having a first porosity and a second filter having a second porosity different than the first porosity.

* * * * *